(12) United States Patent
Kim et al.

(10) Patent No.: US 8,042,042 B2
(45) Date of Patent: Oct. 18, 2011

(54) TOUCH SCREEN-BASED DOCUMENT EDITING DEVICE AND METHOD

(75) Inventors: Tae Kyung Kim, Yangju-si (KR); Jae Joon Hwang, Seoul (KW); Byeong Cheol Hwang, Seoul (KR)

(73) Assignee: Republic of Korea (KR)

( * ) Notice: Subject to any disclaimer, the term of this patent is extended or adjusted under 35 U.S.C. 154(b) by 971 days.

(21) Appl. No.: 11/652,381

(22) Filed: Jan. 11, 2007

(65) Prior Publication Data

US 2007/0186158 A1    Aug. 9, 2007

(30) Foreign Application Priority Data

Feb. 9, 2006   (KR) .................. 10-2006-0012343

(51) Int. Cl.
*G06F 17/00* (2006.01)
*G06F 3/048* (2006.01)

(52) U.S. Cl. ........ 715/255; 715/234; 715/244; 715/716; 715/788; 345/173

(58) Field of Classification Search .................. 715/200, 715/201, 204, 205, 209, 226, 229, 231, 234, 715/243, 250, 251, 255, 256, 273, 700, 718, 715/719, 746, 760, 762, 763, 764, 210, 228, 715/244, 245, 253, 716, 727, 731, 773, 788, 715/800, 857, 858, 860; 345/179, 418, 581, 345/582, 619, 650, 676
See application file for complete search history.

(56) References Cited

U.S. PATENT DOCUMENTS

| | | | | |
|---|---|---|---|---|
| 5,297,216 A | * | 3/1994 | Sklarew | 382/189 |
| 5,727,224 A | * | 3/1998 | Tsuji | 715/259 |
| 5,953,541 A | * | 9/1999 | King et al. | 710/67 |
| 5,956,423 A | * | 9/1999 | Frink et al. | 382/187 |
| 6,049,329 A | * | 4/2000 | Zetts et al. | 345/179 |
| 6,212,297 B1 | * | 4/2001 | Sklarew | 382/189 |

(Continued)

FOREIGN PATENT DOCUMENTS

EP    0848528 A2 *   6/1998

(Continued)

OTHER PUBLICATIONS

F. Sandnes, "Evaluating Mobile Text Entry Strategies with Finite State Automata", ACM, Sep. 2005, pp. 115-121.*

(Continued)

*Primary Examiner* — Maikhanh Nguyen
(74) *Attorney, Agent, or Firm* — The Farrell Law Firm, P.C.

(57) ABSTRACT

A touch screen-based document editing device and method, the device includes an editing symbol storage for storing editing symbols used for editing a document; a display for presenting the document, the display being implemented as a touch screen; a user interface for allowing a user to input an editing request for editing the document presented on the display; a video processor for managing presentation information of the document, displaying the document in an editing mode screen in response to the editing request, and presenting the editing symbol on the document; a video analyzer for receiving the presentation information from the video processor, and extracting the editing symbols and positions of the editing symbols in the document; an editing symbol recognizer for retrieving the editing symbols from the editing symbol storage; and a document editor for executing an editing command on the basis of the editing symbols.

9 Claims, 7 Drawing Sheets

U.S. PATENT DOCUMENTS

| | | | |
|---|---|---|---|
| 6,269,187 B1 * | 7/2001 | Frink et al. | 382/187 |
| 6,370,282 B1 * | 4/2002 | Pavley et al. | 382/311 |
| 6,690,364 B1 * | 2/2004 | Webb | 345/173 |
| 6,751,779 B1 * | 6/2004 | Kurosawa et al. | 715/209 |
| 6,760,012 B1 * | 7/2004 | Laurila | 345/169 |
| 7,002,560 B2 * | 2/2006 | Graham | 345/169 |
| 7,167,826 B2 * | 1/2007 | Cho | 704/201 |
| 7,170,503 B2 * | 1/2007 | Kang et al. | 345/173 |
| 2004/0075652 A1 * | 4/2004 | Kang et al. | 345/173 |
| 2005/0012723 A1 * | 1/2005 | Pallakoff | 345/173 |
| 2005/0093826 A1 * | 5/2005 | Huh | 345/168 |
| 2005/0212780 A1 * | 9/2005 | Tokkonen | 345/179 |
| 2007/0115264 A1 * | 5/2007 | Yu et al. | 345/173 |
| 2007/0152978 A1 * | 7/2007 | Kocienda et al. | 345/173 |
| 2007/0152980 A1 * | 7/2007 | Kocienda et al. | 345/173 |

FOREIGN PATENT DOCUMENTS

| | | | |
|---|---|---|---|
| EP | 1517228 A2 * | 3/2005 | |
| KR | 1020020034021 | 5/2002 | |
| WO | WO 97/30386 * | 8/1997 | |
| WO | WO 03/023593 A1 * | 3/2003 | |
| WO | WO 2004/111816 A2 * | 12/2004 | |
| WO | WO 2006/020305 A2 * | 2/2006 | |

OTHER PUBLICATIONS

D. Ward et al., "Dasher—a Data Entry Inferface Using Continuous Gestures and Language Models", ACM, Nov. 2000, pp. 129-137.*

* cited by examiner

| SYMBOL | MEANING | COMMAND |
|---|---|---|
| ⌒ | CLOSE UP EXTRA SPACE | Command #1 |
| ∽ | TRANSPOSE | Command #2 |
| ⇆ | RUN ON | Command #3 |
| ∨ | INSERT SPACE | Command #4 |
| = | DELETE | Command #5 |
| ⋮ | ⋮ | ⋮ |

TOUCH SCREEN-BASED DOCUMENT EDITING DEVICE AND METHOD

CROSS REFERENCE TO RELATED APPLICATIONS

This application claims priority under 35 U.S.C. §119 to an application entitled "TOUCH SCREEN-BASED DOCUMENT EDITING DEVICE AND METHOD" filed in the Korean Intellectual Property Office on Feb. 9, 2006 and assigned Serial No. 2006-0012343, the contents of which are incorporated herein by reference.

BACKGROUND OF THE INVENTION

1. Field of the Invention

The present invention relates to a document editing device and method and, in particular, to a touch screen-based document editing device and method.

2. Description of the Related Art

Typically, information-processing devices such as personal computers (PC), personal digital assistants (PDA), and mobile telephones, are equipped with a keypad as an input means. By manipulating the keypad, a user may input commands which may include alphabetical and/or numerical characters.

Currently, touch screens are typically used for retail settings, point of sale (POS) systems, automatic teller machines (ATM), and devices in which a stylus is often used to manipulate a graphic user interface (GUI) and for entering data.

Since most functions may be implemented by utilizing keys displayed on a screen, so called 'soft buttons', a touch screen substantially reduces the number of necessary mechanical keys of the keypad and enhances user manipulation.

Further, since the touch screen can provide different key sets for different applications and small keys to be selected are simultaneously displayed on the screen, it is possible to reduce the size of the device using a touch screen-based input mechanism. For these reasons, the touch screens are utilized in smart phones, PDAs, portable game consoles, and other various small electrical appliances.

Figure 1:
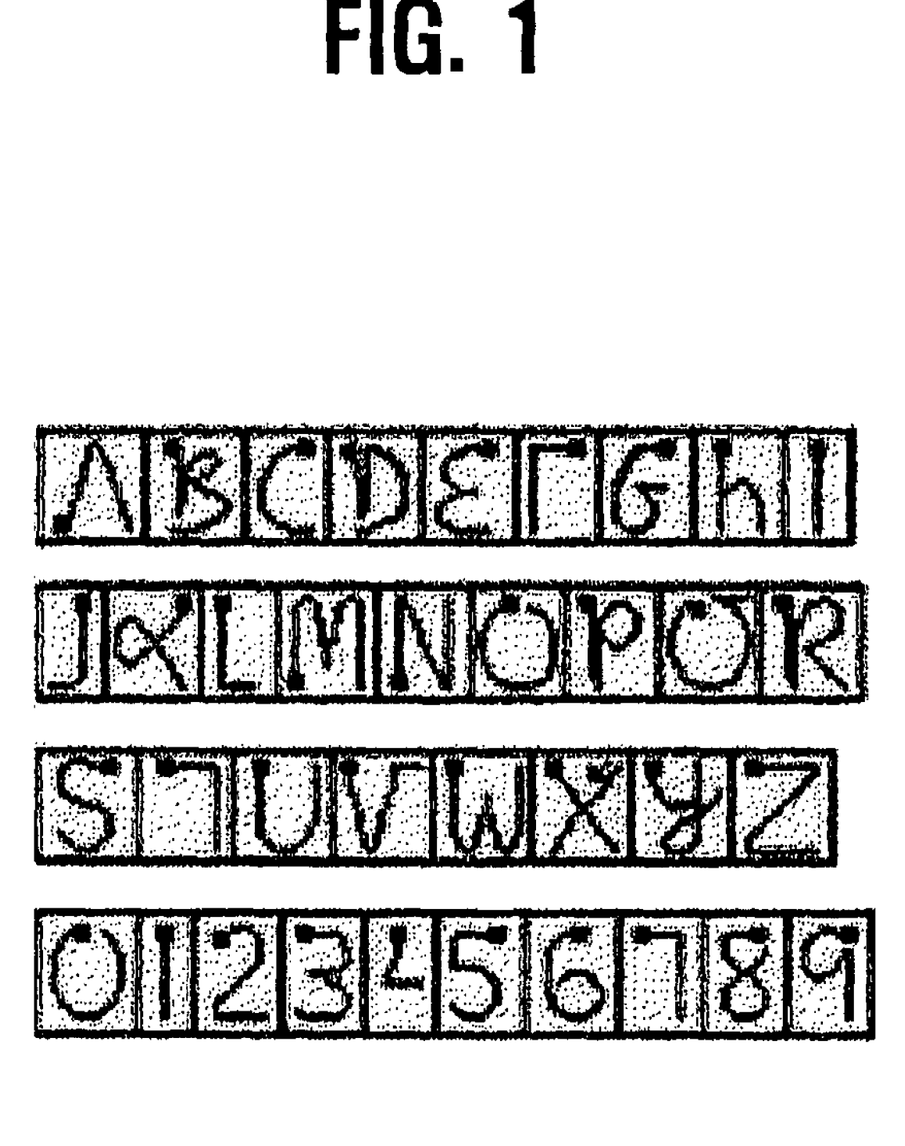
FIG. 1 is a view illustrating examples of graffiti according to a conventional graffito input method.

Frequently, the touch screen is implemented with an input mechanism such as a graffito input, a virtual keyboard (for example, soft buttons), and a menu command for inputting letters. In case of graffito-based input mechanism, the alphabetical and/or numerical characters are represented in characterized forms such that a letter or number is input by selecting a corresponding graffito. FIG. 1 is a view illustrating examples of graffiti according to a conventional graffito input mechanism. As shown in FIG. 1, alphabetical and/or numerical characters are presented in graffiti form. With the graffito input mechanism, it is possible to simplify input of alphabetical and numerical characters.

As data communication technologies have advanced and electronic documents are widely utilized, electronic documents are frequently exchanged through a communication network for sharing opinions between individuals. In order to communicate opinions on a subject of an electronic document, it is required to edit the document in communication devices.

However, in the case of a small communication device such as a PDA equipped with a touch screen, which operates with a conventional input mechanism such as the graffito input or menu command mechanism, it is very complicated and uncomfortable for a user to edit a document on such device.

SUMMARY OF THE INVENTION

The present invention has been made in an effort to solve the above problems, and it is an object of the present invention to provide a touch screen-based document editing device and method in which the touch screen may be intuitively manipulated for editing a document.

It is another object of the present invention to provide a touch screen-based document editing device and method which facilitates editing of a document by using editing symbols.

In accordance with one aspect of the present invention, the above and other objects are accomplished by a touch screen-based document editing device. The touch screen-based document editing device includes an editing symbol storage for storing editing symbols used for editing an electronic document; a display for presenting the electronic document, the display implemented as a touch screen; a user interface for user input of an editing request for editing the electronic document presented on the display; a video processor for managing presentation information of the electronic document, displaying the electronic document in an editing mode screen in response to the editing request, and presenting the editing symbol on the electronic document in response to an editing symbol insertion command input through the touch screen; a video analyzer for receiving the presentation information from the video processor and extracting the editing symbols and positions of the editing symbols in the electronic document, in response to an editing execution command input by user manipulation; an editing symbol recognizer for receiving information on the editing symbols and positions of the editing symbols from the video analyzer, retrieving the editing symbols from the editing symbol storage, and detecting editing commands corresponding to the editing symbols; and a document editor for executing the editing commands according to the editing symbols and the positions of the editing symbols.

Preferably, the editing symbol storage stores the editing symbols, meanings of the editing symbols, and commands for applying the editing symbols to the electronic document.

Preferably, the video processor controls the display to include spaces in the electronic document for presenting the editing symbols in response to the editing request.

Preferably, the video processor controls the display to increase the distance between text lines of the electronic document.

Preferably, the video processor controls the display to terminate the editing mode and present the electronic document edited according to the editing command.

Preferably, the video processor controls the display to decrease the distance between the text lines to be the same as that before entering the editing mode.

In accordance with another aspect of the present invention, the above and other objects are accomplished by a touch screen-based document editing method. The touch screen-based document editing method includes displaying an electronic document in an editing mode in response to input of an editing request when the document is displayed in a normal mode, presenting an editing symbol within the electronic document corresponding to an editing symbol signal input through a touch screen, detecting an editing command from previously stored editing symbol information in response to an editing execution command, editing the document according to the detected editing commands, and terminating the editing mode to present the electronic document in the normal mode.

Preferably, the step of displaying an electronic document in an editing mode includes inclusion of spaces for presenting editing symbols in the electronic document.

Preferably, the spaces are included between text lines of the electronic document.

Preferably, the step of terminating the editing mode includes decreasing the distance between the text lines of the electronic document to that of a normal mode.

Preferably, the step of displaying an editing command includes applying the editing symbols corresponding to the editing commands to the electronic document.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF PREFERRED EMBODIMENTS

Preferred embodiments of the present invention are described with reference to the accompanying drawings in detail. The same reference numbers are used throughout the drawings to refer to the same or like parts. Detailed descriptions of well-known functions and structures incorporated herein are omitted to avoid obscuring the subject matter of the present invention.

Figure 2:
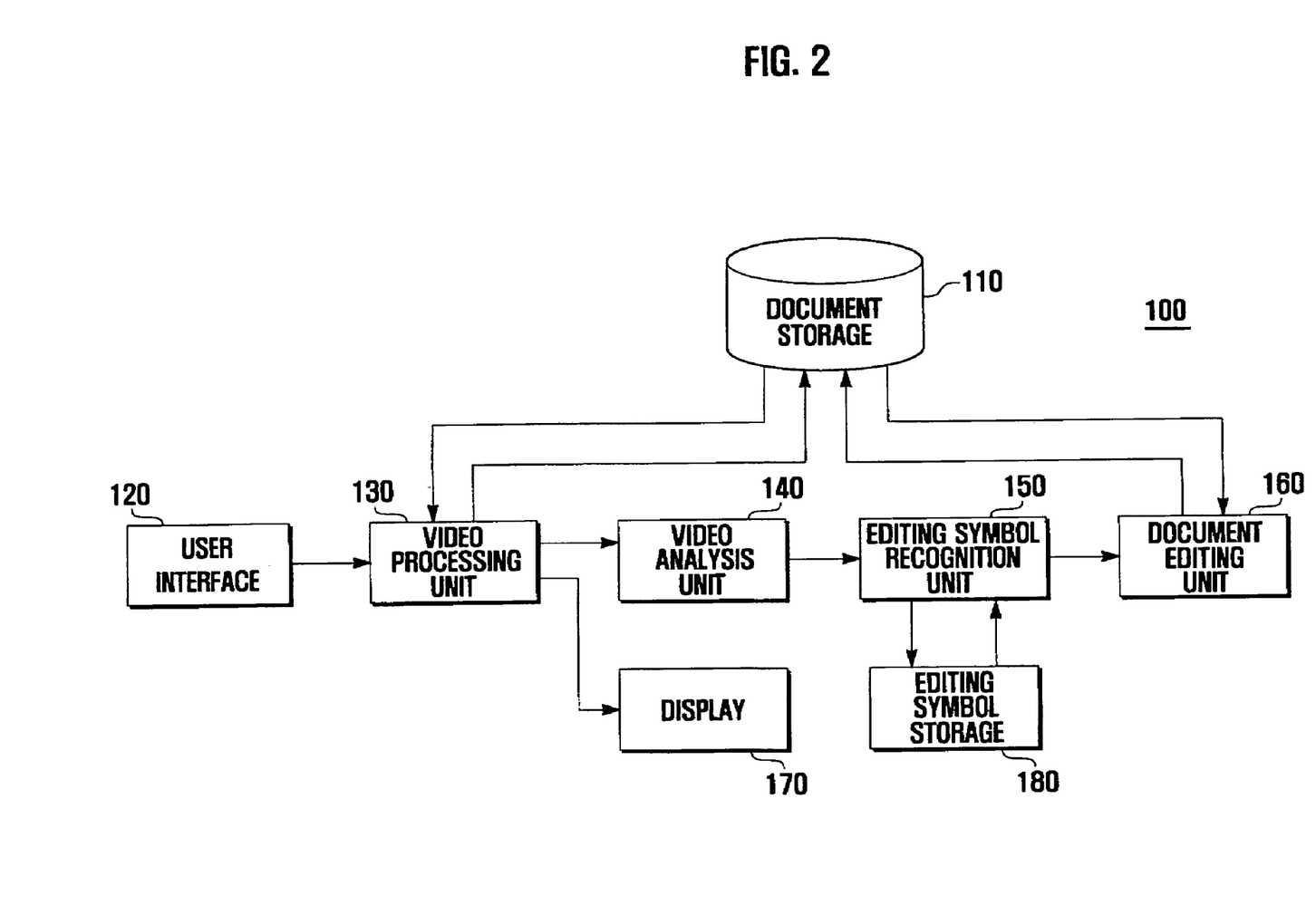
FIG. 2 is a block diagram illustrating a configuration of a document editing device according to the present invention.

FIG. 2 is a block diagram illustrating a configuration of a document editing device according to the present invention.

As shown in FIG. 2, the document editing device 100 includes a document storage 110, a user interface 120, a video processing unit 130, a video analysis unit 140, an editing symbol recognition unit 150, a document editing unit 160, a display 170, and an editing symbol storage 180.

The document storage 110 stores documents received through a network or produced by a user.

The user interface 120 allows a user to input data and commands to display the data on the display 170, or transmits the commands to the video processing unit 130. For example, the user can input a command to switch to an editing mode from a normal mode. The user interface unit 120 may be soft buttons implemented on a touch screen or mechanical keys installed on the body of the document editing device 100.

The video processing unit 130 performs preprocessing on an image to be displayed through the display 170 in response to the user command input through the user interface 120. Once a specific document is requested through the user interface 120, the video processing unit retrieves the requested document from the document storage 110 and the retrieved document on the display 170. In addition, if an editing command is input through the user interface 120, the video processing unit 130 displays the document on the display 170 in an editing mode. The editing mode screen provides spaces in which editing symbols can be presented according to the user's manipulation. The document is presented in the editing mode, such that the text lines are arranged to have a distance between the text lines wide enough to show the editing symbols (refer to FIG. 5A). The wide distance between the text lines are decreased when the editing mode is terminated.

If an editing symbol is selected on a touch screen (not shown) while the editing mode screen is presented, the video processing unit 130 inputs the corresponding editing symbol in the document to be displayed on the display 170 and stores a currently displayed image as image presentation status information. At this time, the editing symbol is input according to a predetermined manipulation. Whenever an editing symbol is input, the editing symbol is inserted to the document and the corresponding image presentation status information is stored.

In the meantime, if an editing execution command is input through the user interface 120, the video processing unit 130 transmits the image presentation status information to the video analysis unit 140. Once the image presentation status information is received, the video analysis unit 140 analyzes the image presentation status information, and checks types and locations of the editing symbols. Sequentially, the video analysis unit 140 sends the analysis results to the editing symbol recognition unit 150.

Upon receiving the analysis result of the image presentation status information, the editing symbol recognition unit 150 generates an editing command corresponding to the analysis result. In detail, the editing symbol recognition unit 150 extracts the editing symbols contained in the image presentation status information, and retrieves a command corresponding to the editing symbol from the editing symbol storage 180. That is, the editing symbol recognition unit 150 retrieves all of the commands corresponding to the editing symbols of the image presentation status information from the editing symbol storage 180. In addition, the editing symbol recognition unit 150 transmits information on the editing symbols and their locations to the document editing unit 160.

The document editing unit 160 performs editing of the document presented on the display 170 on the basis of the editing symbols and their locations received from the editing symbol recognition unit 150. For example, if an editing symbol '??' for inputting a space between characters is located at the second line of a document, the document editing unit 160 inserts a space at the corresponding location of the document.

Display 170 displays the video signals under the control of the video processing unit 130. Preferably, the display 170 presents an image represented by video signals that are preprocessed by the video processing unit 130. In particular, the display 170 can show the document in the editing mode screen under the control of the video processing unit 130. In addition, the display 170 is implemented with a touch screen to transmit the command input through the touch screen to the video processing unit 130.

The editing symbol storage 180 stores the information on the editing symbols used for editing the document. The editing symbols are stored in a form of mapping in which the editing symbols are linked to corresponding commands and usage information on the respective editing symbols. A mapping table is shown in FIG. 3.

Figure 3:
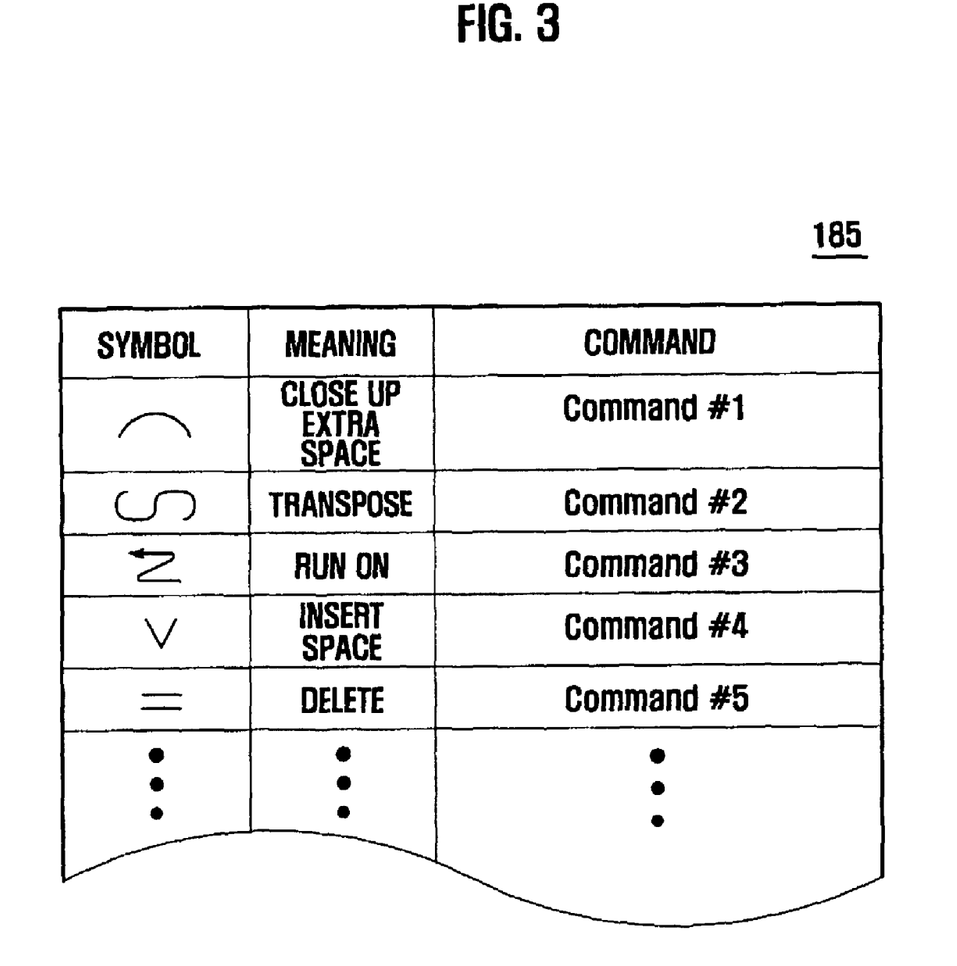
FIG. 3 is a view illustrating an example of a mapping table of editing symbols according to the present invention.

FIG. 3 is a view illustrating an example of a mapping table of editing symbols according to the present invention.

As shown in FIG. 3, the mapping table includes a symbol column, a meaning column, and a command column.

Figure 4:
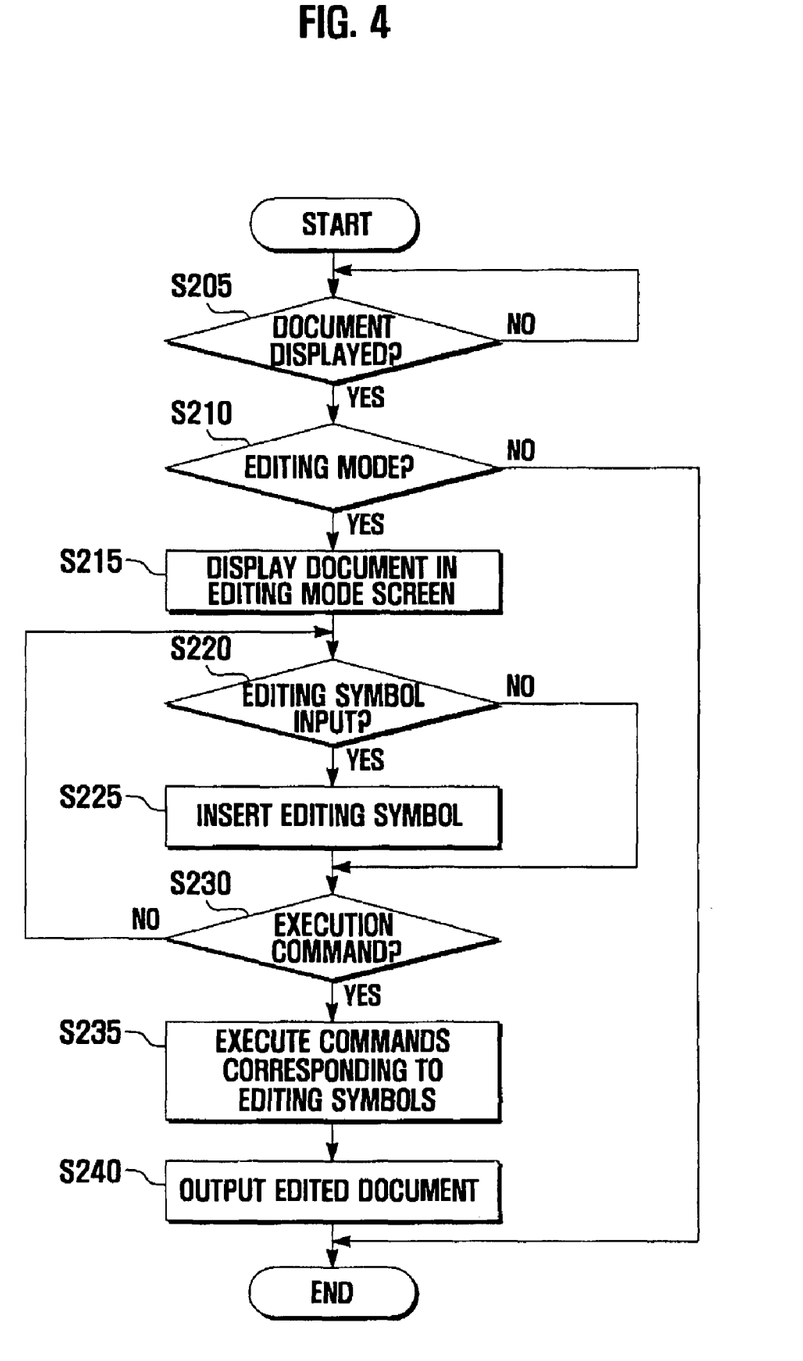
FIG. 4 is a flowchart illustrating a touch screen-based document editing method according to the present invention.

FIG. 4 is a flowchart illustrating a touch screen-based document editing method according to the present invention.

Figure 5A:
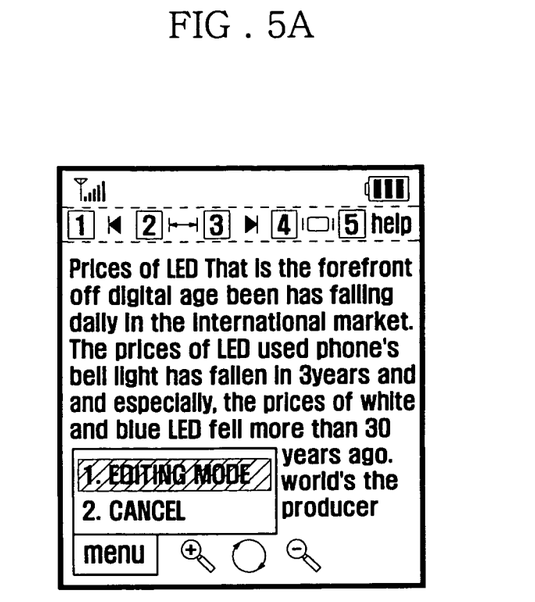
FIGS. 5A to 5E are screen views illustrating editing steps of an electronic document according to the present invention.
Figure 5B:
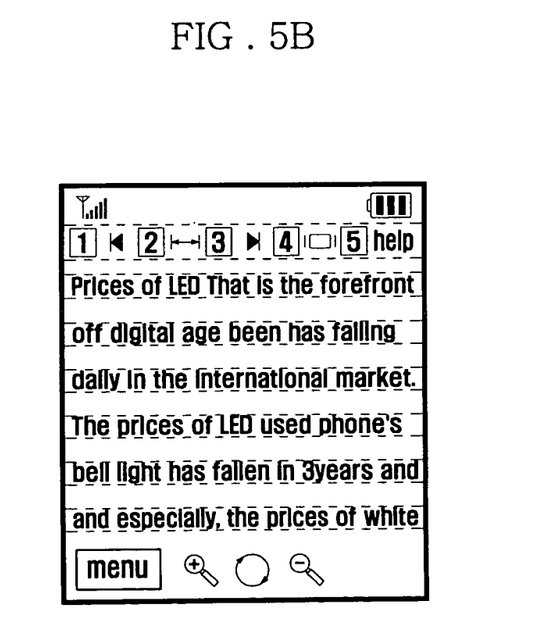

Referring to FIGS. 2 and 4, the device 100 determines whether a document is displayed at step S205. If a document is displayed, the device determines whether there is a command input through the user interface 120 for entering an editing mode at step S210. In a normal mode, the document is presented as shown in FIG. 5A. If there is an input command for switching to the editing mode, the device displays the document in an editing mode screen at step S215. In the editing mode, the document is presented as shown in FIG. 5B.

After the document is open in the editing mode screen, the device determines whether a command for inserting an editing symbol is input at step S220. The editing symbol insertion command is generated by manipulating a stylus pen on the touch screen in a predetermined manner.

If an editing symbol insertion command is input, the device inserts the editing symbol at a position where a cursor is located in the document at step S225.

Once the editing symbol is inserted to the document, the information on the editing symbol is transmitted to the video processing unit 130. The video processing unit 130 transmits image presentation information corresponding to the editing symbol information such that the display 170 displays the inserted editing symbols within the document. In addition, the display 170 transmits the information on the currently presented image to the video processing unit 130.

Figure 5C:
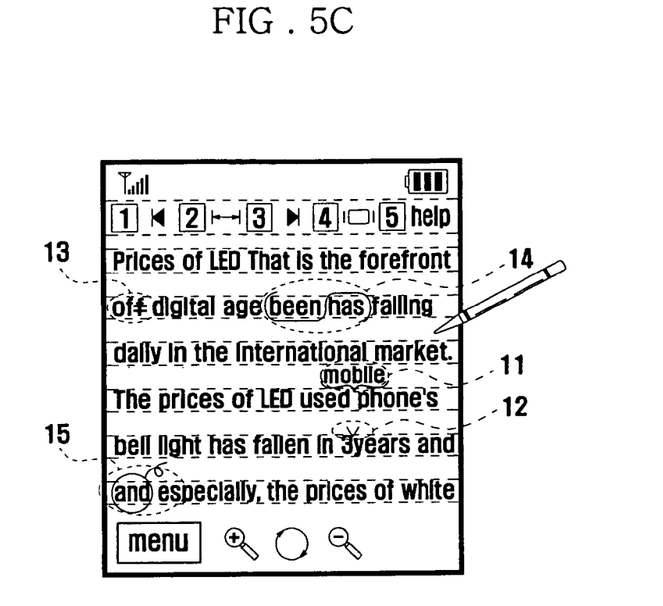

FIG. 5C is a screen view illustrating an example of an editing mode screen, in which editing symbols are inserted to the document. As shown in FIG. 5C, the document is displayed in an editing mode such that the editing symbols, i.e., an insertion symbol 11, a spacing symbol 12, deletion symbols 13 and 15, and an transpose symbol 14, inserted according to the user's command are presented.

While the editing mode screen is displayed, the device determines whether an editing execution command is input at step S230. If the editing execution command is input, the device executes the command corresponding to the editing symbol inserted to the document at step S235 and then outputs the document as edited at step S240. At this time, the video processing unit 130 transmits the image presentation information that has been saved until the input of the editing execution command to the video analysis unit 140. On the basis of the analysis and recognition result of the video analysis unit 140 and the editing symbol recognition unit 150 respectively, the document editing unit 160 performs editing operations corresponding to the editing symbols. The device stores the edited document in the document storage 110 and presents the edited document through the display 170.

Figure 5D:
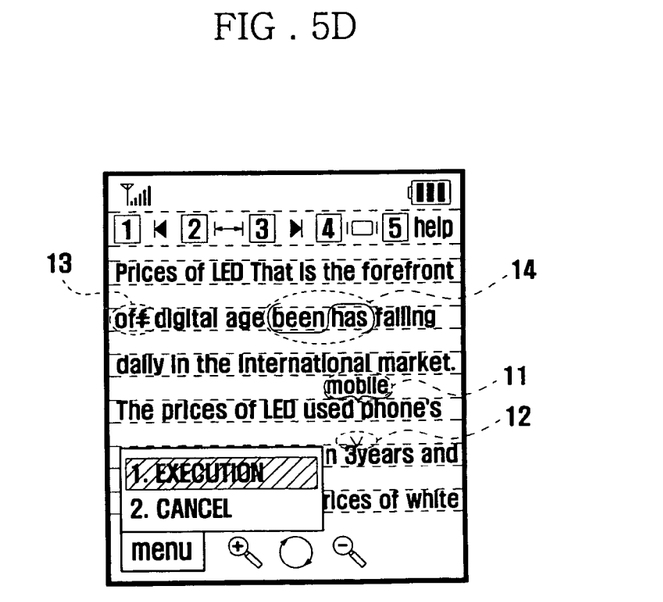

FIG. 5D is a screen view illustrating an example of an editing mode screen in which an editing execution command is input. As shown in FIG. 5D, while the editing symbols are inserted to the document, the editing execution command is input by selecting a button presented on the touch screen.

Figure 5E:
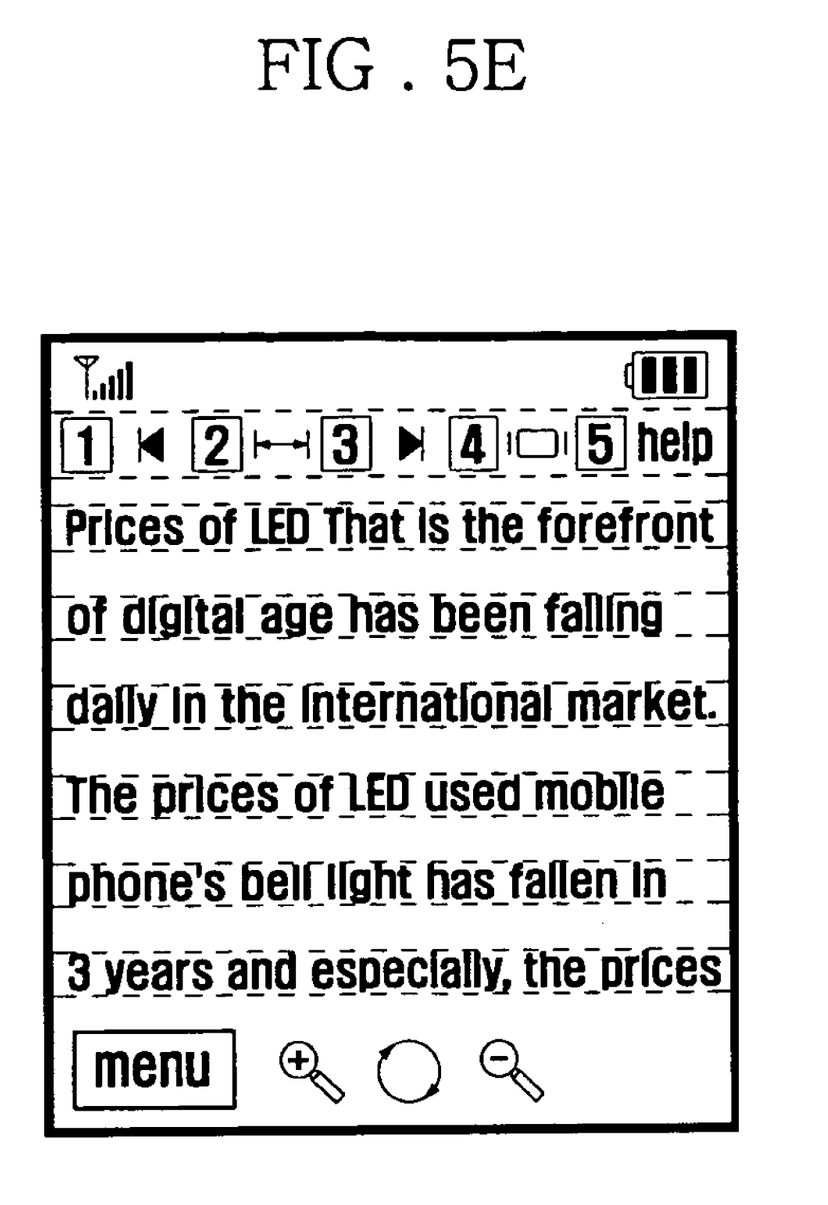

FIG. 5E is a screen view illustrating an example of a normal mode screen in which the document is presented as edited. As shown in FIG. 5E, all the editing commands represented by the editing symbols, i.e., an insertion symbol 11, a spacing symbol 12, deletion symbols 13 and 15, and an exchange symbol 14, are reflected in the document.

Although preferred embodiments of the present invention are described in detail hereinabove, it should be clearly understood that many variations and/or modifications of the basic inventive concepts herein taught which may appear to those skilled in the present art will still fall within the spirit and scope of the present invention, as defined in the appended claims.

As described above, the document editing method of the present invention allows the user to input commands using a touch screen and stylus pen, and therefore users without knowledge on the editing commands may intuitively edit the document.

In the present invention, touch screen and stylus pen are used instead of the conventional keypad input device, such that the user can easily edit electronic documents.

In addition, the electronic document editing procedure is dramatically simplified with an intuitive touch screen interface.

What is claimed is:

1. A touch screen-based document editing device comprising:
    an editing symbol storage configured to store editing symbols used for editing an electronic document;
    a display for presenting configured to present the electronic document, the display being implemented as a touch screen for inputting an editing symbol insertion commands;
    a user interface configured to input, by a user, an editing request for editing the electronic document and an editing execution command;
    a video processor configured to manage presentation information of the electronic document, including spaces between text lines of the electronic document to increase a distance between each and every text line of the electronic document in an editing mode in response to the editing request, and presenting editing symbols on the spaces between the text lines of the electronic document in response to the editing symbol insertion commands;
    a video analyzer configured to extract the presented editing symbols and positions of the presented editing symbols in the electronic document according to the presentation information, in response to the editing execution command;
    an editing symbol recognizer configured to retrieve the presented editing symbols from the editing symbol storage and detecting editing commands corresponding to the presented editing symbols; and
    a document editor configured to execute the editing commands according to the presented editing symbols and the positions of the presented editing symbols,
    wherein the video processor controls the display to decrease the distance between the text lines to be the same as that before entering the editing mode.

2. The touch screen-based document editing device of claim 1, wherein the editing symbol storage stores the editing symbols, meanings of the editing symbols, and commands for applying the editing symbols to the electronic document.

3. The touch screen-based document editing device of claim 1, wherein the video processor controls the display to terminate the editing mode and presents the electronic document edited according to the editing command.

4. The touch screen-based document editing device of claim 1, wherein the document editor applies each of the presented editing symbols to one of the text lines positioned below each respective editing symbol.

5. The touch screen-based document editing device of claim 1, wherein the editing symbol is a non-text symbol corresponding to an editing command for editing new text indicated by a location of the editing symbol.

6. A touch screen-based document editing method comprising:
    storing editing symbols used for editing an electronic document;

presenting the electronic document, by a display, the display being implemented as a touch screen for inputting an editing symbol insertion commands;

inputting an editing request for editing the electronic document and an editing execution command;

managing presentation information of the electronic document, including spaces between text lines of the electronic document to increase a distance between each and every text line of the electronic document in an editing mode in response to the editing request, and presenting editing symbols within the spaces between the text lines of the electronic document in response to the editing symbol insertion commands;

extracting the presented editing symbols and positions of the presented editing symbols in the electronic document according to the presentation information, in response to an editing execution command;

retrieving the presented editing symbols from the editing symbol storage and detecting editing commands corresponding to the presented editing symbols; and executing the editing commands according to the presented editing symbols and the positions of the presented editing symbols, decreasing the distance between the text lines to be the same as that before entering the editing mode.

7. The touch screen-based document editing method of claim 6, wherein detecting editing commands includes applying the presented plurality of editing symbols corresponding to the editing commands to the electronic document.

8. The touch screen-based document editing method of claim 6, executing the editing commands includes applying each of the presented editing symbols to one of the text lines positioned below each respective editing symbol.

9. The touch screen-based document editing method of claim 6, wherein the editing symbol is a non-text symbol corresponding to an editing command for editing new text indicated by a location of the editing symbol.

* * * * *